United States Patent [19]
Brady

[11] Patent Number: 6,065,788
[45] Date of Patent: May 23, 2000

[54] HAND GRIPPER

[76] Inventor: R. Keith Brady, P.O. Box 42, Norwood, Colo. 81423

[21] Appl. No.: 09/238,107

[22] Filed: Jan. 27, 1999

Related U.S. Application Data

[60] Provisional application No. 60/072,851, Jan. 28, 1998.

[51] Int. Cl.[7] .................................................. B65G 7/12
[52] U.S. Cl. ........................................... 294/31.2; 294/16
[58] Field of Search ............................. 294/15, 16, 27.1, 294/28, 31.1, 31.2, 106, 150–157, 164, 165, 169; 24/132 R, 133; 220/752, 754, 758

[56] References Cited

U.S. PATENT DOCUMENTS

| | | | |
|---|---|---|---|
| 1,058,926 | 4/1913 | Toole | 294/16 |
| 2,385,913 | 10/1945 | Fink | 294/16 X |
| 3,301,585 | 1/1967 | Johnson | 294/16 X |
| 3,632,151 | 1/1972 | Wosnitzky | 294/16 |
| 4,116,374 | 9/1978 | Garello | 294/31.2 X |
| 4,236,743 | 12/1980 | Fox | 294/28 X |
| 4,866,813 | 9/1989 | Dupont | 294/31.2 X |

*Primary Examiner*—Johnny D. Cherry
*Attorney, Agent, or Firm*—Jacqueline S. Larson; Donald W. Erickson

[57] ABSTRACT

A hand gripping apparatus useful for securely holding and moving objects that are difficult or unhandy to grasp, hold and move by hand. The apparatus has two hinged or pivotally moveable jaws with handles which when squeezed together by hand securely grasp a belt between the jaws. One end of the belt is connected to the apparatus, the other end is wrapped around the object and extending the belt through the jaws where it is held when the handles are pressed together.

7 Claims, 3 Drawing Sheets

HAND GRIPPER

This application claims the benefit of U.S. provisional application Ser. No. 60/072,851, filed Jan. 28, 1998.

BACKGROUND OF THE INVENTION

This invention relates to an apparatus, useable by hand, for gripping and hauling (moving) objects. More particularly, this invention is directed at a hand apparatus which grips and facilitates safe movement of carrying of objects that are difficult or unhandy to grasp and then move or carry. Such objects include cylinders for various gases, drums, barrels, boxes, tanks, appliances, and other objects moved or carried by hand.

SUMMARY OF THE INVENTION

Briefly stated, the gripping apparatus of the present invention comprises two jaw plates, the jaw plates being hinged or pivotally connected at or near the base thereof a handle connected directly or indirectly to each jaw plate, a belt attachment member or belt loop connected directly or indirectly to one of the jaw plates and a belt connected at one end thereof to the belt attachment member, said belt being of sufficient length so that the free end thereof can be drawn or wrapped around the object to be gripped and the belt then extending between the jaws is securely held by the jaw plates when said handles are drawn toward one another when gripped by the hand(s) of the person using the apparatus.

DETAILED DESCRIPTION OF THE INVENTION

Figure 1:
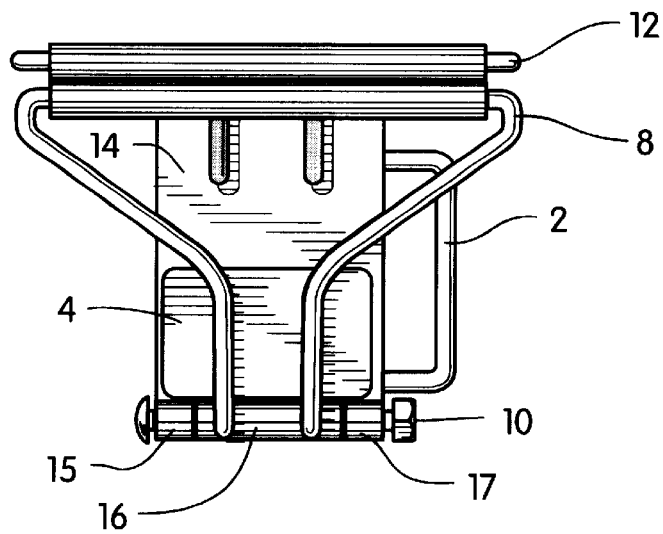
FIG. 1 is a front elevational view of a hand gripper of the present invention.
Figure 2:
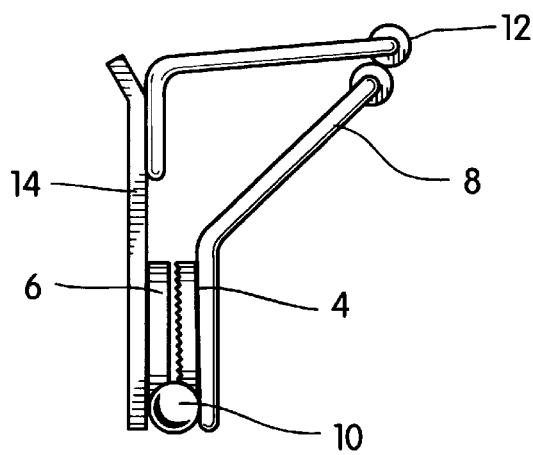
FIG. 2 is a side elevational view, left side, of FIG. 1
Figure 3:
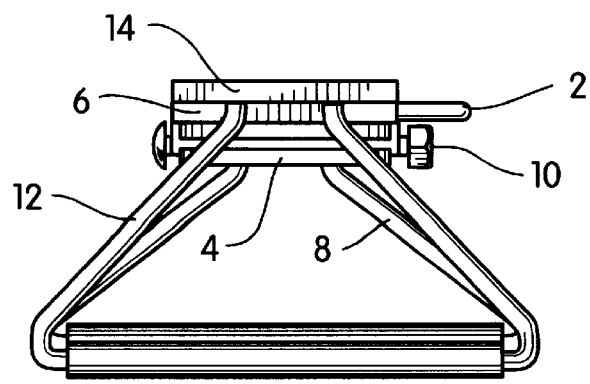
FIG. 3 is a top plan view thereof.
Figure 4:
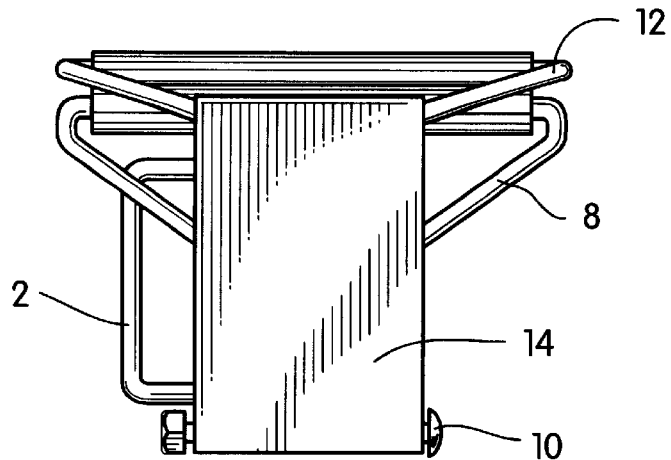
FIG. 4 is a rear elevational view of the embodiment of FIG. 1.
Figure 5:
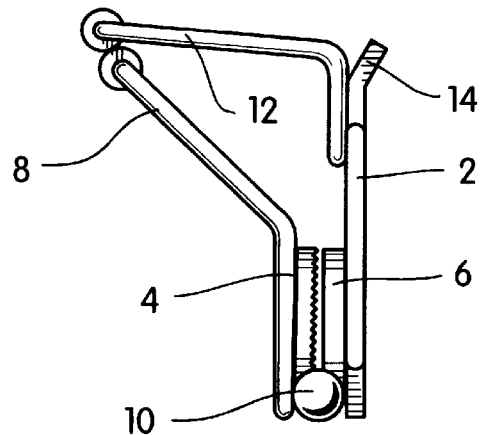
FIG. 5 is a side elevational view, right side, of FIG. 1.
Figure 6:
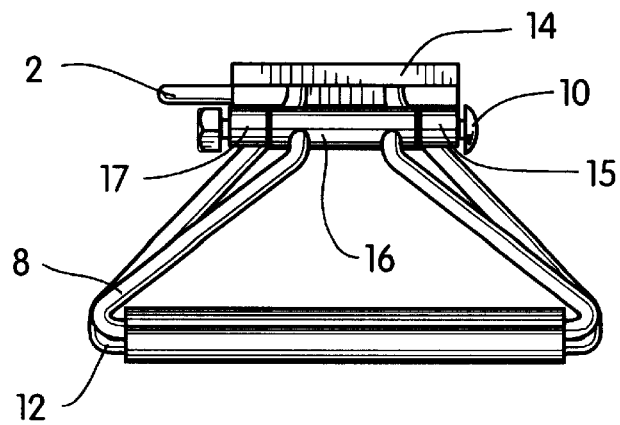
FIG. 6 is a bottom plan view thereof
Figure 7:
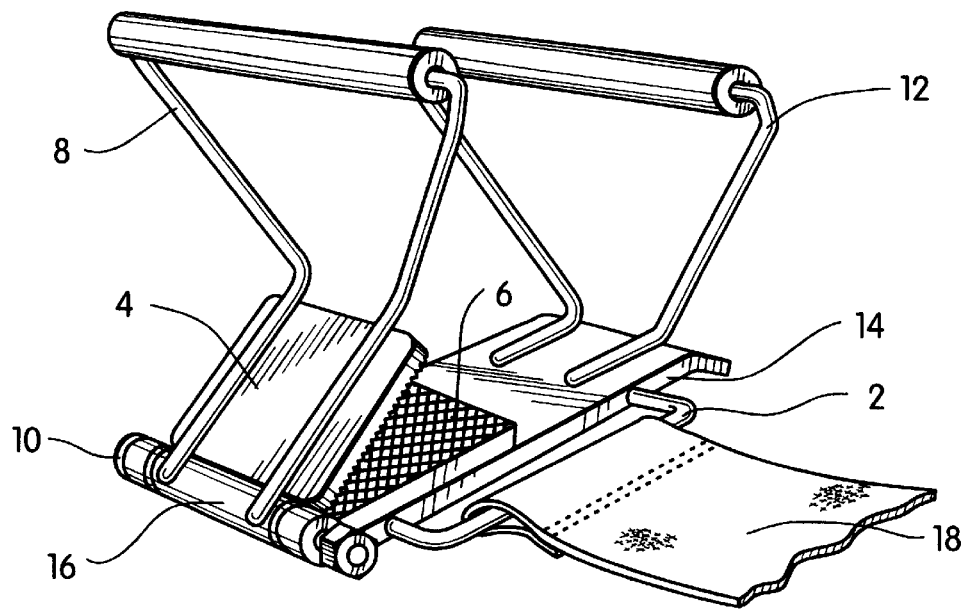
FIG. 7 is an enlarged perspective view thereof in the open or release position.
Figure 8:
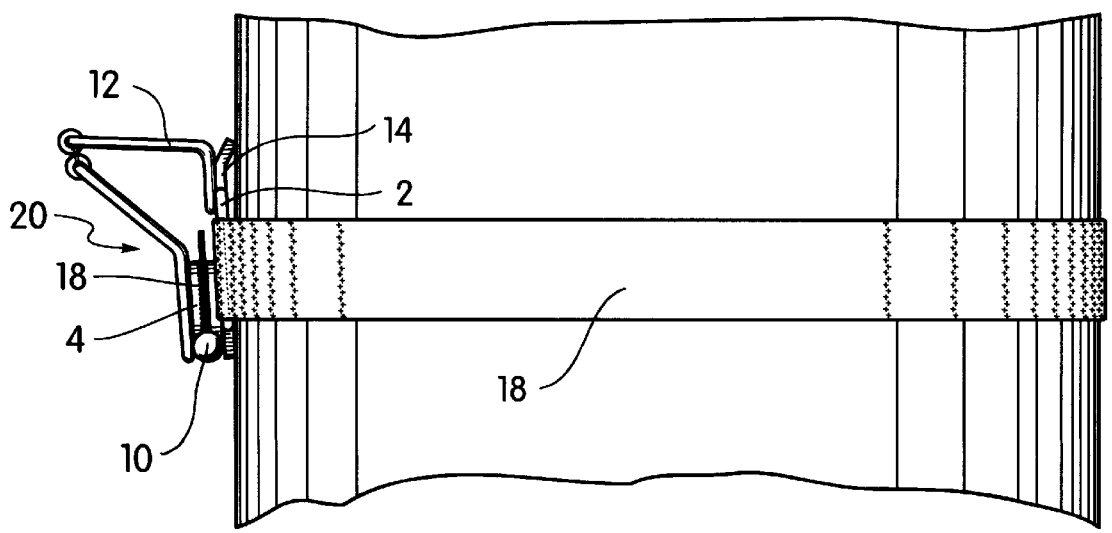
FIG. 8 is a side elevational view of the hand gripper apparatus held in place on a gas cylinder.

Referring to the drawings, a preferred embodiment of the apparatus 20 of the present invention is shown by FIGS. 1 to 8. As best shown in FIGS. 1, 2, 4, 5 and 7, the rear or back part of the apparatus that contacts the surface of the object to be gripped comprises rear support plate 14, rear handle 12, rear jaw plate 6, belt attachment member 2(belt loop), belt 18 and hinge components 15 and 17. The handle 12, jaw plate 6, hinge components 15 and 17 and belt loop 2 are suitably welded to support plate 14. The plate 14 can be about 3 by 5 inches, the jaw plate about 1.5–2 by 3 inches with a scored, ribbed or serrated surface to enhance gripping, and the belt loop about 2 to 3 inches. The belt loop can be welded to the side of support plate 14, which is preferred, or to the side of jaw plate 6. In another embodiment of the invention, the jaw plate 6 can be an integral part of support plate 14 to form a single plate. Rear handle 12, in a presently preferred embodiment, extends at about a ninety degree angle relative to the rear support plate 14, as shown in FIGS. 2, 5 and 8. The front part of the apparatus which is hingedly connected to the rear part is comprised of a somewhat truncated front handle 8 with hinge component 16 at the base thereof and front jaw plate 4. In a presently preferred embodiment, substantially the upper half of front handle 8 extends at about a forty-five degree angle relative to the rear support plate 14 when the apparatus is in a closed position, as shown in FIGS. 2, 5 and 8. Hinge component 16 is welded to and near the lower end of handle 8 and meshes with hinge components 15 and 17. The hinge components are cooperatively joined together by bolt 10 or a pin. In the embodiment shown, jaw plates 4 and 6 are of the same size and when handles 12 and 8 are drawn together (see FIGS. 2, 5 and 8) or gripped together by the user, the belt 18 is very securely held between the jaw plates. When the user takes his hand pressure off of the handles, the jaw plates release the belt, as shown in FIG. 7, and, in turn, the object held by the belt is released.

The belt 18 is suitably a web belt of a strong material such as nylon, polyester, cotton, blends thereof, and the like. The other components of the apparatus 20 can be constructed of a good quality metal, plastic, or combination thereof The apparatus of the present invention provides an inexpensive and convenient means of securely gripping many types of cumbersome objects safely for movement of such objects.

Variations to the embodiment shown can be made without departing from the scope or spirit of the invention. For example, different hinge or pivot means can be used. Instead of a solid support plate 14, the plate 14 can be eliminated and the downward extending components of the handle continued and jaw plate 6 welded thereto as jaw plate 4 is welded to handle 8. Also, the apparatus instead of having flat plates as shown can have plates that art curved in conformance with the surface of an object such as a gas cylinder. Also, the apparatus instead of having a relatively narrow support plate 14 can have a support plate with a larger surface area to help support and stabilize larger objects for moving.

What is claimed is:

1. A hand gripping apparatus for securing a hold on and moving an object by hand, the apparatus comprising:

pivotally moveable front and rear jaw plates;

a rear support plate for supporting said rear jaw plate;

a rear handle attached to and near the upper end of said rear support plate;

a belt attached at one end thereof to said rear support plate or to said rear jaw plate, said belt being of sufficient length to wrap around said object and extend between said front and rear jaw plates;

a front handle for supporting said front jaw plate, wherein the upper end of said front handle cooperatively meets with the upper end of said rear handle when said front and rear handles are gripped in a closed position; and first hinge means attached to said rear support plate and second hinge means attached to said front handle, said first and second hinge means being cooperatively joined together to permit pivotal movement of said front and rear jaw plates whereby said belt can be securely gripped between said front and rear jaw plates when said front and rear handles are squeezed together.

2. The apparatus according to claim 1 wherein said front and rear jaw plates have substantially the same surface area.

3. The apparatus according to claim 1 wherein said rear handle extends at about a ninety degree angle relative to said rear support plate.

4. The apparatus according to claim 1 wherein substantially the upper half of said front handle extends at about a forty-five degree angle relative to said rear support plate when the apparatus is in a closed position.

5. The apparatus according to claim 1 wherein said rear handle extends at about a ninety degree angle relative to said rear support plate, and wherein substantially the upper half of said front handle extends at about a forty-five degree angle relative to said rear support plate when the apparatus is in a closed position, so that said front and rear handles can be squeezed together by hand.

6. The apparatus according to claim 1 which further comprises a belt loop for attaching said belt to said rear support plate or to said rear jaw plate.

7. The apparatus according to claim 1 which further comprises a belt loop for attaching said belt to said rear support plate.

\* \* \* \* \*